United States Patent
Oh et al.

(10) Patent No.: US 11,795,283 B2
(45) Date of Patent: Oct. 24, 2023

(54) POLYAMIDE-BASED FILM, AND COVER WINDOW AND DISPLAY DEVICE COMPRISING SAME

(71) Applicant: SK microworks Co., Ltd., Gyeonggi-do (KR)

(72) Inventors: Dae Seong Oh, Gyeonggi-do (KR); Han Jun Kim, Gyeonggi-do (KR); Sun Hwan Kim, Gyeonggi-do (KR); Jin Woo Lee, Gyeonggi-do (KR); Heung Sik Kim, Gyeonggi-do (KR)

(73) Assignee: SK MICROWORKS CO., LTD., Gyeonggi-do (KR)

( * ) Notice: Subject to any disclaimer, the term of this patent is extended or adjusted under 35 U.S.C. 154(b) by 150 days.

(21) Appl. No.: 17/495,078

(22) Filed: Oct. 6, 2021

(65) Prior Publication Data
US 2022/0153941 A1    May 19, 2022

(30) Foreign Application Priority Data
Nov. 13, 2020 (KR) .......................... 10-2020-0152301

(51) Int. Cl.
*C08J 5/18* (2006.01)

(52) U.S. Cl.
CPC .............. *C08J 5/18* (2013.01); *C08J 2377/06* (2013.01)

(58) Field of Classification Search
CPC ........ C08J 2377/06; C08J 2377/10; C08J 5/18
See application file for complete search history.

(56) References Cited

U.S. PATENT DOCUMENTS

| 2019/0077915 A1 | 3/2019 | Yun et al. |
| 2021/0230449 A1 | 7/2021 | Park et al. |

FOREIGN PATENT DOCUMENTS

| JP | 2016-108482 A | 6/2016 |
| JP | 2019-512559 A | 5/2019 |

(Continued)

OTHER PUBLICATIONS

Office Action issued by the Korean Intellectual Property Office dated Feb. 16, 2022.
(Continued)

*Primary Examiner* — Mark S Kaucher
(74) *Attorney, Agent, or Firm* — IP & T GROUP LLP

(57) ABSTRACT

The embodiments relate to a polyamide-based film excellent in optical properties, mechanical properties, and processing suitability and to a cover window and a display device comprising the same. The polyamide-based film comprises a polyamide-base polymer, wherein a dipolar solvent compatibility represented by the following equation is 18.5 to 24: Dipolar solvent compatibility=$\sqrt{(\sigma_d-\delta 1_d)^2+(\sigma_p-\delta 1_p)^2}$. In the equation, $\sigma_d$ is a value of a dispersible component in surface energy of the polyamide-based film, $\sigma_p$ is a value of a polar component in surface energy of the polyamide-based film, $\delta 1_d$ is a value of a dispersible component in Hansen solubility parameter of the dipolar solvent, and $\delta 1_p$ a value of a dipolar component in Hansen solubility parameter of the dipolar solvent.

16 Claims, 1 Drawing Sheet

(56) References Cited

FOREIGN PATENT DOCUMENTS

| JP | 2020-167085 A | 10/2020 | | |
|---|---|---|---|---|
| KR | 10-2010-0015554 A | 2/2010 | | |
| KR | 10-2020-0047127 A | 5/2020 | | |
| WO | 2008/133848 A2 | 11/2008 | | |
| WO | WO-2020085869 A1 * | 4/2020 | ............. | B32B 27/08 |

OTHER PUBLICATIONS

Office Action for the Japanese Patent Application No. 2021-165240 issued by the Japanese Patent Office dated Oct. 11, 2022.

* cited by examiner

[Fig. 1]
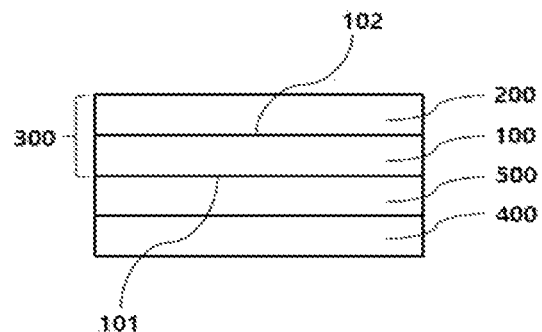
[Fig. 2]
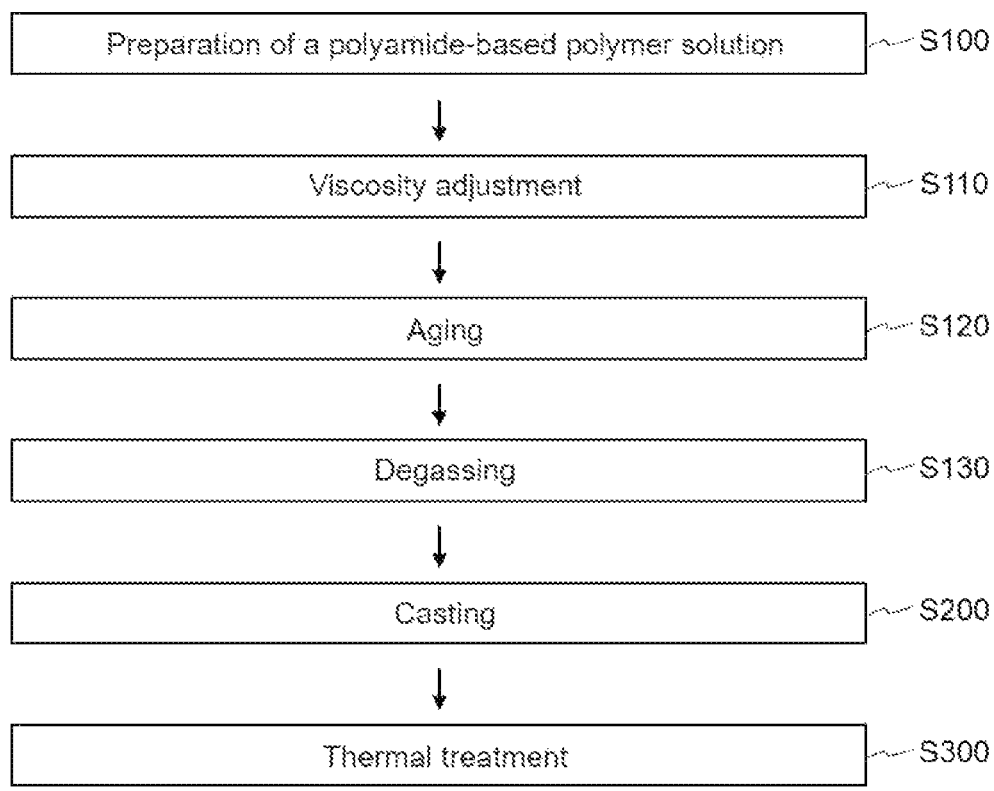

POLYAMIDE-BASED FILM, AND COVER WINDOW AND DISPLAY DEVICE COMPRISING SAME

The present application claims priority of Korean patent application number 10-2020-0152301 filed on Nov. 13, 2020. The disclosure of each of the foregoing applications is incorporated herein by reference in its entirety.

TECHNICAL FIELD

Embodiments relate to a polyamide-based film and to a cover window and a display device comprising same.

BACKGROUND ART

Polyamide-based polymers are excellent in resistance to friction, heat, and chemicals. Thus, they are employed in such applications as primary electrical insulation, coatings, adhesives, resins for extrusion, heat-resistant paintings, heat-resistant boards, heat-resistant adhesives, heat-resistant fibers, and heat-resistant films.

Polyamide is used in various fields. For example, polyamide is made in the form of a powder and used as a coating for a metal or a magnetic wire. It is mixed with other additives depending on the application thereof. In addition, polyamide is used together with a fluoropolymer as a painter for decoration and corrosion prevention. It also plays a role of bonding a fluoropolymer to a metal substrate. In addition, polyamide is used to coat kitchenware, used as a membrane for gas separation by virtue of its heat resistance and chemical resistance, and used in natural gas wells for filtration of such contaminants as carbon dioxide, hydrogen sulfide, and impurities.

In recent years, polyamide has been developed in the form of a film, which is less expensive and has excellent optical, mechanical, and thermal characteristics. Such a polyamide-based film may be applied to display materials for organic light-emitting diodes (OLEDs) or liquid crystal displays (LCDs), and the like, and to antireflection films, compensation films, and retardation films if retardation properties are implemented.

When such a polyamide-based film is applied to a foldable display, a flexible display, and the like, optical properties such as transparency and colorlessness and mechanical properties such as flexibility and hardness are required. In general, however, since optical properties and mechanical properties are in a trade-off relationship, an improvement in the mechanical properties would impair the optical properties.

Accordingly, research on polyamide-based films with improved mechanical properties and optical properties is continuously required.

DISCLOSURE OF INVENTION

Technical Problem

An object of the embodiments is to provide a polyamide-based film excellent in optical properties, mechanical properties, and processing suitability and a cover window and a display device comprising the same.

Solution to Problem

The polyamide-based film according to an embodiment comprises a polyamide-based polymer, wherein a dipolar solvent compatibility represented by the following Equation 1 is 18.5 to 24.

$$\text{Dipolar solvent compatibility} = \sqrt{(\sigma_d - \delta 1_d)^2 + (\sigma_p - \delta 1_p)^2} \quad \text{[Equation 1]}$$

In Equation 1, $\sigma_d$ is a value of a dispersible component in surface energy of the polyamide-based film, $\sigma_p$ is a value of a polar component in surface energy of the polyamide-based film, $\delta 1_d$ is a value of a dispersible component in Hansen solubility parameter of the dipolar solvent, which ranges from 13 to 17, and $\delta 1_p$ is a value of a dipolar component in Hansen solubility parameter of the dipolar solvent, which ranges from 5 to 13.

The polyamide-based film according to an embodiment comprises a polyamide-based polymer, wherein a dispersible solvent compatibility represented by the following Equation 2 is 24.5 to 30.5.

$$\text{Dispersible solvent compatibility} = \sqrt{(\sigma_d - \delta 2_d)^2 + (\sigma_p - \delta 2_p)^2} \quad \text{[Equation 2]}$$

In Equation 2, $\sigma_d$ is a value of a dispersible component in surface energy of the polyamide-based film, $\sigma_p$ is a value of a polar component in surface energy of the polyamide-based film, $\delta 2_d$ is a value of a dispersible component in Hansen solubility parameter of the dispersible solvent, which ranges from 7 to 10, and $\delta 2_p$ is a value of a dipolar component in Hansen solubility parameter of the dispersible solvent, which ranges from 0.1 to 15.2.

The cover window for a display device according to an embodiment comprises a polyamide-based film and a functional layer, wherein a dipolar solvent compatibility of the polyamide-based film represented by the following Equation 1 is 18.5 to 24.

The display device according to an embodiment comprises a display unit; and a cover window disposed on the display unit, wherein the cover window comprises a polyamide-based film and a functional layer, and a dipolar solvent compatibility of the polyamide-based film represented by the following Equation 1 is 18.5 to 24.

Advantageous Effects of Invention

The polyamide-based film according to the embodiment has a dipolar solvent compatibility in a predetermined range, so that the wettability to a post-processing solution can be increased while the surface structure is maintained during the post-processing (e.g., coating). Accordingly, it is possible to provide a polyamide-based film capable of performing post-processing treatment with improved closeness and uniformity, and maintaining excellent optical properties and mechanical properties.

In addition, the polyamide-based film according to the embodiment has a dispersible solvent compatibility in a predetermined range, so that strong closeness with a post-processed body can be secured during the post-processing treatment in which case the optical properties and mechanical properties of the polyamide-based film can be maintained.

BRIEF DESCRIPTION OF THE DRAWINGS

FIG. 1 is a cross-sectional view of a display device according to an embodiment.

FIG. 2 is a schematic flow diagram of a process for preparing a polyamide-based film according to an embodiment.

<Explanation of Reference Numerals>

100: polyamide-based film
101: first side
102: second side

-continued

<Explanation of Reference Numerals>

| 200: functional layer | 300: cover window |
|---|---|
| 400: display unit | 500: adhesive layer |

BEST MODE FOR CARRYING OUT INVENTION

Hereinafter, the embodiments will be described in detail with reference to the accompanying drawings so that those skilled in the art to which the present invention pertains may easily practice them. However, the embodiments may be implemented in many different ways and are not limited to those described herein.

Throughout the present specification, in the case where each film, window, panel, layer, or the like is mentioned to be formed "on" or "under" another film, window, panel, layer, or the like, it means not only that one element is directly formed on or under another element, but also that one element is indirectly formed on or under another element with other element(s) interposed between them. In addition, the term on or under with respect to each element may be referenced to the drawings. For the sake of description, the sizes of individual elements in the appended drawings may be exaggeratedly depicted and do not indicate the actual sizes. In addition, the same reference numerals refer to the same elements throughout the specification.

Throughout the present specification, when a part is referred to as "comprising" an element, it is understood that other elements may be comprised, rather than other elements are excluded, unless specifically stated otherwise.

In the present specification, a singular expression is interpreted to cover a singular or plural number that is interpreted in context unless otherwise specified.

In addition, all numbers expressing quantities of components, reaction conditions, and the like used herein are to be understood as being modified by the term "about" unless otherwise indicated.

The terms first, second, and the like are used herein to describe various elements, and the elements should not be limited by the terms. The terms are used only for the purpose of distinguishing one element from another.

In addition, the term "substituted" as used herein means to be substituted with at least one substituent group selected from the group consisting of deuterium, —F, —Cl, —Br, —I, a hydroxyl group, a cyano group, a nitro group, an amino group, an amidino group, a hydrazine group, a hydrazone group, an ester group, a ketone group, a carboxyl group, a substituted or unsubstituted alkyl group, a substituted or unsubstituted alkenyl group, a substituted or unsubstituted alkynyl group, a substituted or unsubstituted alkoxy group, a substituted or unsubstituted alicyclic organic group, a substituted or unsubstituted heterocyclic group, a substituted or unsubstituted aryl group, and a substituted or unsubstituted heteroaryl group. The substituent groups enumerated above may be connected to each other to form a ring.

Polyamide-Based Film

The embodiments provide a polyamide-based film that not only is excellent in optical properties in terms of high transmittance, low haze, and low yellow index but also has excellent modulus and post-processing suitability.

The polyamide-based film according to an embodiment comprises a polyamide-based polymer.

The polyamide-based film has a dipolar solvent compatibility represented by the following Equation 1 of 18.5 to 24.

$$\text{Dipolar solvent compatibility} = \sqrt{(\sigma_d - \delta 1_d)^2 + (\sigma_p - \delta 1_p)^2} \quad \text{[Equation 1]}$$

In Equation 1, $\sigma_d$ is a value of a dispersible component in surface energy of the polyamide-based film, $\sigma_p$ is a value of a polar component in surface energy of the polyamide-based film, $\delta 1_d$ is a value of a dispersible component in Hansen solubility parameter of the dipolar solvent, and $\delta 1_p$ a value of a dipolar component in Hansen solubility parameter of the dipolar solvent.

The surface energy may be calculated from, for example, a contact angle of water and diiodomethane to the polyamide-based film.

The total surface energy, of which the dispersible component and the polar component may be defined by the following Equation 3.

$$\text{Total surface energy } (\sigma_t) = \text{dispersible component } (\sigma_d) + \text{polar component } (\sigma_p) \quad \text{[Equation 3]}$$

The total solubility parameter of the Hansen solubility parameter, of which the dispersible component, the dipolar component, and the hydrogen-bonding component may be defined by the following Equation 4.

$$\text{Total solubility parameter } (\delta_t) = \sqrt{\begin{array}{l}(\text{dispersible component } (\delta_d))^2 + \\ (\text{dipolar component } (\delta_p))^2 + \\ (\text{hydrogen bonding component } (\delta_h))^2\end{array}} \quad \text{[Equation 4]}$$

If a polyamide-based film has a dipolar solvent compatibility of less than 18.5, its modulus may be deteriorated. In addition, if a polyamide-based film has a dipolar solvent compatibility of less than 18.5, its wettability to a post-processing solvent may be reduced. In such a case, the uniformity, closeness, and adhesion of the polyamide-based film and a post-processed coating layer and may be reduced.

If a polyamide-based film has a dipolar solvent compatibility of greater than 24, its transmittance, haze, and yellow index may be deteriorated. In addition, if a polyamide-based film has a dipolar solvent compatibility of greater than 24, the post-processing solvent may excessively dissolve the surface of the polyamide-based film during the post-processing treatment. As a result, the surface structure of the polyamide-based film may be at least partially damaged. Therefore, the post-processing solvent may not spread uniformly on the surface of the polyamide-based film.

Preferably, the dipolar solvent compatibility may be 18.5 or more, 19 or more, or 19.5 or more, and it may be 23.5 or less or 23 or less. For example, the dipolar solvent compatibility may be 18.5 to 23.5, 18.5 to 23, 19 to 24, 19 to 23.5, 19 to 23, 19.5 to 24, 19.5 to 23.5, or 19.5 to 23.

For example, the dipolar solvent may have a total Hansen solubility parameter $(\delta 1_t)$ of 15 or more. Preferably, the dipolar solvent may have a total Hansen solubility parameter of 30 or less. In the dipolar solvent, the dipolar component $(\delta 1_p)$ in the Hansen solubility parameter may be 5 to 13. Preferably, $\delta 1_p$ may be 6 to 10. In the dipolar solvent, the dispersible component $(\delta 1_d)$ in the Hansen solubility parameter may be 13 to 17. Preferably, $\delta 1_d$ may be 14 to 15.8. In the dipolar solvent, the hydrogen-bonding component $(\delta 1_h)$ in the Hansen solubility parameter may be 3 or more.

Preferably, in the dipolar solvent, the hydrogen-bonding component in the Hansen solubility parameter may be 20 or less.

For example, in the dipolar solvent, the ratio of the dipolar component ($\delta 1_p/\delta 1_t$) in the total Hansen solubility parameter may be 0.2 or more. Preferably, in the dipolar solvent, the ratio of the dipolar component in the total Hansen solubility parameter may be 0.25 or more. In the dipolar solvent, the ratio of the dispersible component ($\delta 1_d/\delta 1_t$) in the total Hansen solubility parameter may be 0.9 or less. Preferably, in the dipolar solvent, the ratio of the dispersible component in the total Hansen solubility parameter may be 0.5 or more, 0.55 or more, or 0.6 or more. In the dipolar solvent, the ratio of the hydrogen-bonding component ($\delta 1_h/\delta 1_t$) in the total Hansen solubility parameter may be 0.2 to 0.8.

As the polyamide-based film according to an embodiment has an affinity with the dipolar solvent in a predetermined range, it has an excellent affinity with, and excellent wettability to, a post-processing solution containing the dipolar solvent, while its surface structure may not be damaged by the post-processing solution. Thus, it has excellent closeness and adhesion to a post-processing body prepared from the post-processing solution, while it can maintain excellent optical properties and mechanical properties.

In some embodiments, the dipolar solvent may comprise a ketone-based compound or an alcohol-based compound. The ketone-based compound may have 2 to 12 carbon atoms and may comprise a linear, branched, or cyclic aliphatic hydrocarbon group or aromatic hydrocarbon group. The ketone-based compound may not comprise a functional group other than a ketone group (—C(=O)—) and a hydrocarbon group. The alcohol-based compound may have 1 to 6 carbon atoms and may comprise a linear, branched, or cyclic aliphatic hydrocarbon group or aromatic hydrocarbon group. The alcohol-based compound may not comprise a functional group other than an alcohol group (—OH) and a hydrocarbon group. For example, the dipolar solvent may comprise at least one of methyl isobutyl ketone, ethanol, and isopropanol. Preferably, it may comprise methyl isobutyl ketone.

In some embodiments, the polyamide-based film may have a dispersible solvent compatibility represented by the following Equation 2 of 24.5 to 30.5.

$$\text{Dispersible solvent compatibility} = \sqrt{(\sigma_d - \delta 2_d)^2 + (\sigma_p - \delta 2_p)^2}$$ [Equation 2]

In Equation 2, $\sigma_d$ is a value of a dispersible component in surface energy of the polyamide-based film, $\sigma_p$ is a value of a polar component in surface energy of the polyamide-based film, $\delta 2_d$ is a value of a dispersible component in Hansen solubility parameter of the dispersible solvent, and $\delta 2_p$ a value of a dipolar component in Hansen solubility parameter of the dispersible solvent.

In some embodiments, the dispersible solvent compatibility may be 25.5 to 30 or 25.5 to 29.

For example, the dispersible solvent may have a total Hansen solubility parameter ($\delta 2_t$) of 10 or less. Preferably, the dispersible solvent may have a total Hansen solubility parameter of 5 or more. In the dispersible solvent, the dipolar component ($\delta 2_p$) in the Hansen solubility parameter may be 0.1 to 15.2. Preferably, $\delta 2_p$ may be 0.1 to 4, 0.1 to 3 or 0.1 to 2. In the dispersible solvent, the dispersible component ($\delta 2_d$) in the Hansen solubility parameter may be 7 to 10. Preferably, $\delta 2_d$ may be 7.5 to 9.6 or 8 to 9. In the dispersible solvent, the hydrogen-bonding component ($\delta 2_h$) in the Hansen solubility parameter may be 4 or less. Preferably, in the dispersible solvent, the hydrogen-bonding component in the Hansen solubility parameter may be 3 or less or 2 or less.

For example, in the dispersible solvent, the ratio of the dipolar component ($\delta 2_p/\delta 2_t$) in the total Hansen solubility parameter may be 0.2 or less. Preferably, in the dispersible solvent, the ratio of the dipolar component in the total Hansen solubility parameter may be 0.1 or less. In the dispersible solvent, the ratio of the dispersible component ($\delta 2_d/\delta 2_t$) in the total Hansen solubility parameter may be 0.9 or more. Preferably, in the dispersible solvent, the ratio of the dispersible component in the total Hansen solubility parameter may be 0.95 or more. In the dispersible solvent, the ratio of the hydrogen-bonding component ($\delta 2_h/\delta 2_t$) in the total Hansen solubility parameter may be 0.4 or less, 0.3 or less, or 0.15 or less.

In some embodiments, the dispersible solvent may comprise an aromatic hydrocarbon compound or a halogenated hydrocarbon compound. The aromatic hydrocarbon compound may have 6 to 18 carbon atoms and may comprise, for example, a benzene-based compound substituted with an alkyl group. The halogenated hydrocarbon compound may have 1 to 6 carbon atoms and may be, for example, one in which a half or more of the hydrogens in the hydrocarbon compound are substituted with halogen. The halogen may preferably be chlorine. Preferably, the dispersible solvent may comprise toluene or chloroform.

In some embodiments, the polyamide-based film may have a surface energy of 35 to 43 mN/m. Preferably, the surface energy of the polyamide-based film may be 37 to 43 mN/m or 37 to 42 mN/m.

In some embodiments, in the polyamide-based film, the dispersibility component ($\sigma_d$) in the surface energy may be 33 to 39 mN/m. Preferably, $\sigma_d$ may be 33 to 38, 34 to 39, 34 to 38, 34.5 to 39, or 34.5 to 38 mN/m.

In some embodiments, in the polyamide-based film, the polar component ($\sigma_p$) in the surface energy may be 2 to 4 mN/m. Preferably, $\sigma_p$ may be 2.5 to 4 or 3 to 4 mN/m.

As the surface energy characteristics are adjusted to the above ranges, the polyamide-based film may satisfy Equation 1 or Equation 2 and may have an affinity with, and wettability to, the dipolar solvent, the dispersible solvent, and/or the post-processing solution in predetermined ranges. In addition, the polyamide-based film satisfying the above surface energy characteristics may have excellent optical properties (transmittance, haze, yellow index, and the like) and mechanical properties (modulus and the like).

The polyamide-based film according to an embodiment may have an x-direction refractive index ($n_x$) of 1.60 to 1.70, 1.61 to 1.69, 1.62 to 1.68, 1.64 to 1.68, 1.64 to 1.66, or 1.64 to 1.65.

In addition, the polyamide-based film may have a y-direction refractive index ($n_y$) of 1.60 to 1.70, 1.61 to 1.69, 1.62 to 1.68, 1.63 to 1.68, 1.63 to 1.66, or 1.63 to 1.64.

Further, the polyamide-based film may have a z-direction refractive index ($n_z$) of 1.50 to 1.60, 1.51 to 1.59, 1.52 to 1.58, 1.53 to 1.58, 1.54 to 1.58, or 1.54 to 1.56.

If the x-direction refractive index, the y-direction refractive index, and the z-direction refractive index of the polyamide-based film are within the above ranges, when the film is applied to a display device, its visibility is excellent not only from the front but also from a lateral side, so that a wide angle of view can be achieved.

The polyamide-based film according to an embodiment may have an in-plane retardation ($R_o$) of 800 nm or less. Specifically, the in-plane retardation ($R_o$) of the polyamide-based film may be 700 nm or less, 600 nm or less, 550 nm or less, 100 nm to 800 nm, 200 nm to 800 nm, 200 nm to 700 nm, 300 nm to 700 nm, 300 nm to 600 nm, or 300 nm to 540 nm.

In addition, the polyamide-based film according to an embodiment may have a thickness direction retardation (Rh) of 5000 nm or less. Specifically, the thickness direction retardation (Rh) of the polyamide-based film may be 4,800 nm or less, 4,700 nm or less, 4,650 nm or less, 1,000 nm to 5,000 nm, 1,500 nm to 5,000 nm, 2,000 nm to 5,000 nm, 2,500 nm to 5,000 nm, 3,000 nm to 5,000 nm, 3,500 nm to 5,000 nm, 4,000 nm to 5,000 nm, 3,000 nm to 4,800 nm, 3,000 nm to 4,700 nm, 4,000 nm to 4,700 nm, or 4,200 nm to 4,650 nm.

Here, the in-plane retardation ($R_o$) is a parameter defined by a product ($\Delta n_{xy} \times d$) of anisotropy ($\Delta n_{xy} = |n_x - n_y|$) of refractive indices of two mutually perpendicular axes on a film and the film thickness (d), which is a measure of the degree of optical isotropy and anisotropy.

In addition, the thickness direction retardation ($R_{th}$) is a parameter defined by a product of an average of the two birefringences $\Delta n_{xz}$ ($=|n_x - n_z|$) and $\Delta n_{yz}$ ($=|n_y - n_z|$) observed on a cross-section in the film thickness direction and the film thickness (d).

If the in-plane retardation and the thickness direction retardation of the polyamide-based film are within the above ranges, when the film is applied to a display device, it is possible to minimize the optical distortion and color distortion and to minimize the light leakage from a lateral side as well.

The polyamide-based film may comprise a filler in addition to the polyamide-base polymer.

The filler may have an average particle diameter of 60 nm to 180 nm. Specifically, the average particle diameter of the first filler may be 80 nm to 180 nm, 100 nm to 180 nm, 110 nm to 160 nm, 120 nm to 160 nm, or 130 nm to 150 nm, but it is not limited thereto.

If the average particle diameter of the filler is within the above range, the optical properties may not be deteriorated even when a relatively large amount thereof is employed as compared with other inorganic fillers.

The filler may have a refractive index of 1.55 to 1.75. Specifically, the refractive index of the filler may be 1.60 to 1.75, 1.60 to 1.70, 1.60 to 1.68, or 1.62 to 1.65, but it is not limited thereto.

If the refractive index of the filler satisfies the above range, the birefringence values related to $n_x$, $n_y$, and $n_z$ can be appropriately adjusted, and the luminance of the film at various angles can be improved.

On the other hand, if the refractive index of the filler is outside the above range, there may arise a problem that the filler is visually noticeable on the film or that the haze is increased due to the filler.

The content of the filler may be 100 to 3,000 ppm based on the total weight of the solids content of the polyamide-based polymer. Specifically, the content of the filler may be 100 ppm to 2,500 ppm, 100 ppm to 2,200 ppm, 200 ppm to 2,500 ppm, 200 ppm to 2,200 ppm, 250 ppm to 2,100 ppm, or 300 ppm to 2,000 ppm, based on the total weight of the solids content of the polyamide-based polymer, but it is not limited thereto.

If the content of the filler is outside the above range, the haze of the film is steeply increased, and the filler may aggregate with each other on the surface of the film, so that a feeling of foreign matter may be visually observed, or it may cause a trouble in the sliding performance or deteriorate the windability in the preparation process.

The filler may comprise, for example, silica and barium sulfate, but it is not limited thereto.

The filler may be employed in the form of particles. In addition, the surface of the filler is not subjected to special coating treatment, and it may be uniformly dispersed in the entire film.

Since the polyamide-based film comprises the filler, the film can secure a wide angle of view without a deterioration in the optical properties.

The content of residual solvents in the polyamide-based film may be 1,500 ppm or less. For example, the content of residual solvents may be 1,200 ppm or less, 1,000 ppm or less, 800 ppm or less, or 500 ppm or less, but it is not limited thereto.

The residual solvent refers to a solvent that has not been volatilized during the film production and remains in the film finally produced.

If the content of the residual solvents in the polyamide-based film exceeds the above range, the durability of the film may be deteriorated, and it may have an impact on the luminance.

When the polyamide-based film according to an embodiment based on a thickness of 50 μm is folded to have a radius of curvature of 3 mm, the number of folding before the fracture may be 200,000 or more.

The number of folding counts one when the film is folded to have a radius of curvature of 3 mm and then unfolded.

As the number of folding of the polyamide-based film satisfies the above range, it can be advantageously applied to a foldable display device or a flexible display device.

The polyamide-based film according to an embodiment may have a surface roughness of 0.01 μm to 0.07 μm. Specifically, the surface roughness may be 0.01 μm to 0.07 μm or 0.01 μm to 0.06 μm, but it is not limited thereto.

As the surface roughness of the polyamide-based film satisfies the above range, it may be advantageous for achieving high luminance even when the angle from the normal direction of a surface light source is increased.

The polyamide-based film according to an embodiment comprises a polyamide-based polymer, and the polyamide-based polymer may comprise an amide repeat unit and, optionally, may comprise an imide repeat unit.

In some embodiments, the polyamide-based polymer may comprise an amide-based repeat unit and an imide-based repeat unit at a molar ratio of 51:49 to 100:0. In such a case, the flexibility, mechanical strength, and optical properties of the polyamide-based film may be enhanced together. Preferably, the polyamide-based polymer may comprise an amide-based repeat unit and an imide-based repeat unit at a molar ratio of 55:45 to 100:0.

The polyamide-based film comprises a polyamide-based polymer, and the polyamide-based polymer may be prepared by simultaneously or sequentially reacting reactants that comprise a diamine compound and a dicarbonyl compound. Specifically, the polyamide-based polymer may be prepared by polymerizing a diamine compound and a dicarbonyl compound.

Alternatively, the polyamide-based polymer is prepared by polymerizing a diamine compound, a dianhydride compound, and a dicarbonyl compound. Here, the polyamide-based polymer may comprise an imide repeat unit derived from the polymerization of the diamine compound and the dianhydride compound and an amide repeat unit derived from the polymerization of the diamine compound and the dicarbonyl compound.

The polyamide-based film according to an embodiment may comprise a polyamide-based polymer in which an amide bond is formed by the polymerization of a diamine compound and a dicarbonyl compound. The polyamide-based film may optionally comprise a polyamide-imide-based polymer in which an imide bond is formed by the further polymerization of a dianhydride compound.

The diamine compound is a compound that forms an imide bond with the dianhydride compound and forms an amide bond with the dicarbonyl compound, to thereby form a copolymer.

The diamine compound is not particularly limited, but it may be, for example, an aromatic diamine compound that contains an aromatic structure. For example, the diamine compound may be a compound represented by the following Formula 1.

$$H_2N\text{-}(E)_e\text{-}NH_2 \quad \text{[Formula 1]}$$

In Formula 1,

E may be selected from a substituted or unsubstituted divalent $C_6$-$C_{30}$ aliphatic cyclic group, a substituted or unsubstituted divalent $C_4$-$C_{30}$ heteroaliphatic cyclic group, a substituted or unsubstituted divalent $C_6$-$C_{30}$ aromatic cyclic group, a substituted or unsubstituted divalent $C_4$-$C_{30}$ heteroaromatic cyclic group, a substituted or unsubstituted $C_1$-$C_{30}$ alkylene group, a substituted or unsubstituted $C_2$-$C_{30}$ alkenylene group, a substituted or unsubstituted $C_2$-$C_{30}$ alkynylene group, —O—, —S—, —C(=O)—, —CH(OH)—, —S(=O)$_2$—, —Si(CH$_3$)$_2$—, —C(CH$_3$)$_2$—, and —C(CF$_3$)$_2$—.

e is selected from integers of 1 to 5. When e is 2 or more, the Es may be the same as, or different from, each other.

$(E)_e$ in Formula 1 may be selected from the groups represented by the following Formulae 1-1a to 1-14a, but it is not limited thereto.

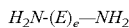
1-1a

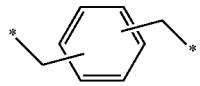
1-2a

1-3a

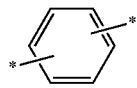
1-4a

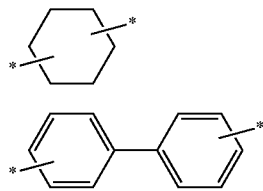
1-5a

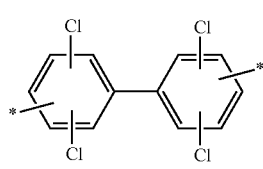
1-6a

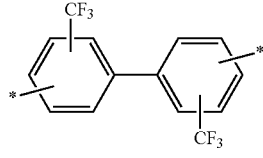
1-7a

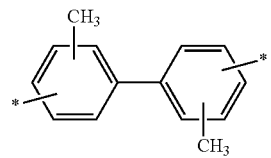
1-8a

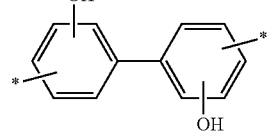
1-9a

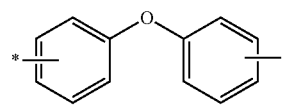
1-10a

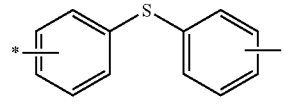
1-11a

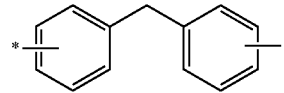
1-12a

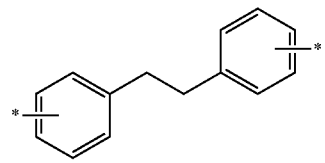
1-13a

*—(CH$_2$)$_n$—*
1-14a
(n is selected from integers of 1 to 12)

Specifically, $(E)_e$ in Formula 1 may be selected from the groups represented by the following Formulae 1-1b to 1-13b, but it is not limited thereto.

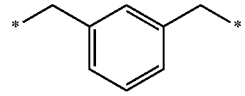
1-1b

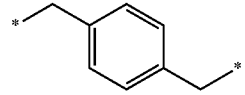
1-2b

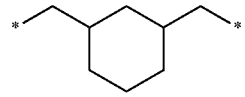
1-3b

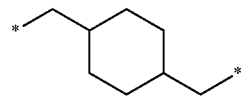
1-4b

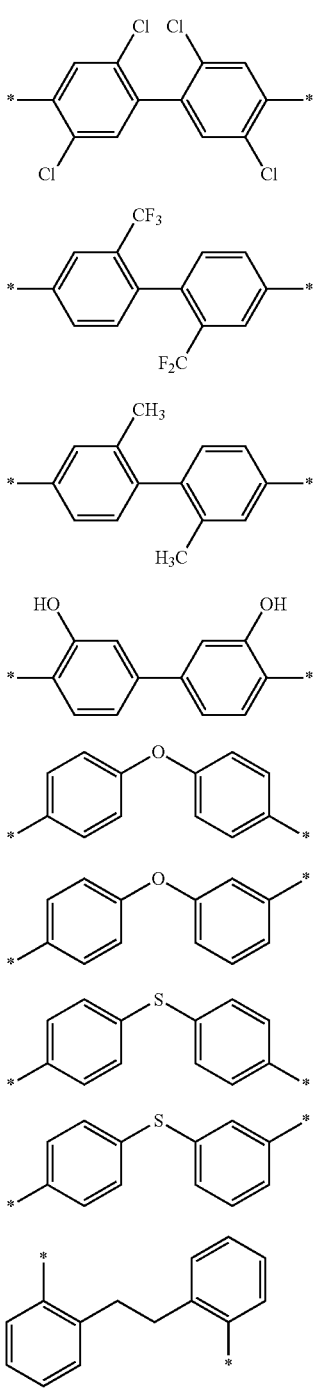

More specifically, $(E)_e$ in Formula 1 may be the group represented by the above Formula 1-6b or the group represented by the above Formula 1-9b.

In an embodiment, the diamine compound may comprise a compound having a fluorine-containing substituent or a compound having an ether group (—O—).

The diamine compound may be composed of a compound having a fluorine-containing substituent. In such event, the fluorine-containing substituent may be a fluorinated hydrocarbon group and specifically may be a trifluoromethyl group. But it is not limited thereto.

In another embodiment, one kind of diamine compound may be used as the diamine compound. That is, the diamine compound may be composed of a single component.

For example, the diamine compound may comprise 2,2'-bis(trifluoromethyl)-4,4'-diaminobiphenyl (TFMB) represented by the following formula, but it is not limited thereto.

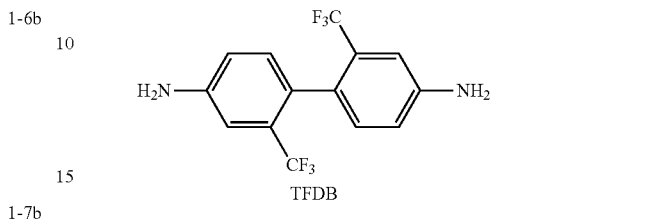

TFDB

The dicarbonyl compound is not particularly limited, but it may be, for example, a compound represented by the following Formula 3.

[Formula 3]

$$X \overset{O}{\underset{}{\text{—}}} (J)_j \overset{O}{\underset{}{\text{—}}} X$$

In Formula 3,

J may be selected from a substituted or unsubstituted divalent $C_6$-$C_{30}$ aliphatic cyclic group, a substituted or unsubstituted divalent $C_4$-$C_{30}$ heteroaliphatic cyclic group, a substituted or unsubstituted divalent $C_6$-$C_{30}$ aromatic cyclic group, a substituted or unsubstituted divalent $C_4$-$C_{30}$ heteroaromatic cyclic group, a substituted or unsubstituted $C_1$-$C_{30}$ alkylene group, a substituted or unsubstituted $C_2$-$C_{30}$ alkenylene group, a substituted or unsubstituted $C_2$-$C_{30}$ alkynylene group, —O—, —S—, —C(=O)—, —CH(OH)—, —S(=O)$_2$—, —Si(CH$_3$)$_2$—, —C(CH$_3$)$_2$—, and —C(CF$_3$)$_2$—.

j is selected from integers of 1 to 5. When j is 2 or more, the Js may be the same as, or different from, each other.

X is a halogen atom. Specifically, X may be F, Cl, Br, I, or the like. More specifically, X may be Cl, but it is not limited thereto.

$(J)_j$ in the above Formula 3 may be selected from the groups represented by the following Formulae 3-1a to 3-14a, but it is not limited thereto.

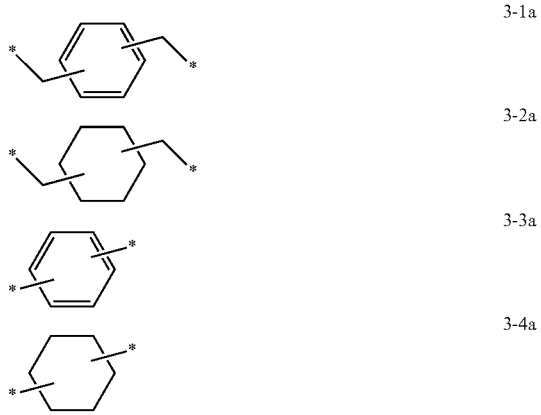

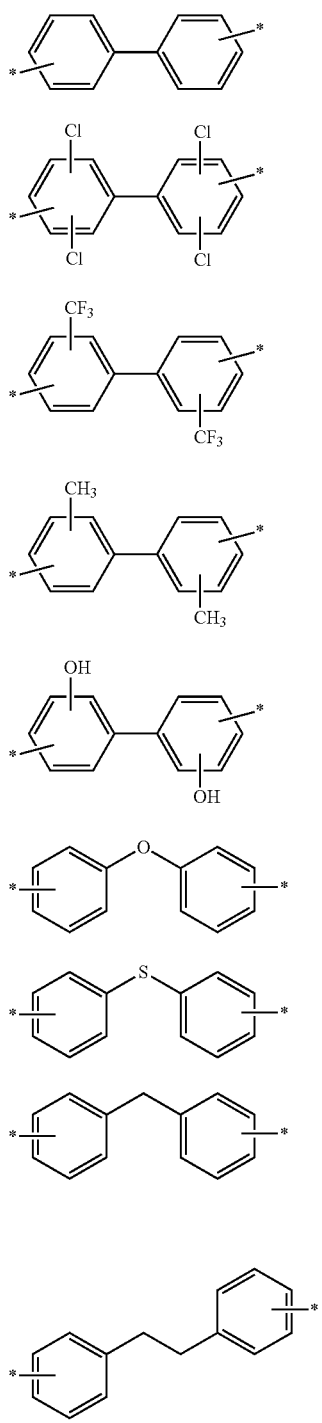

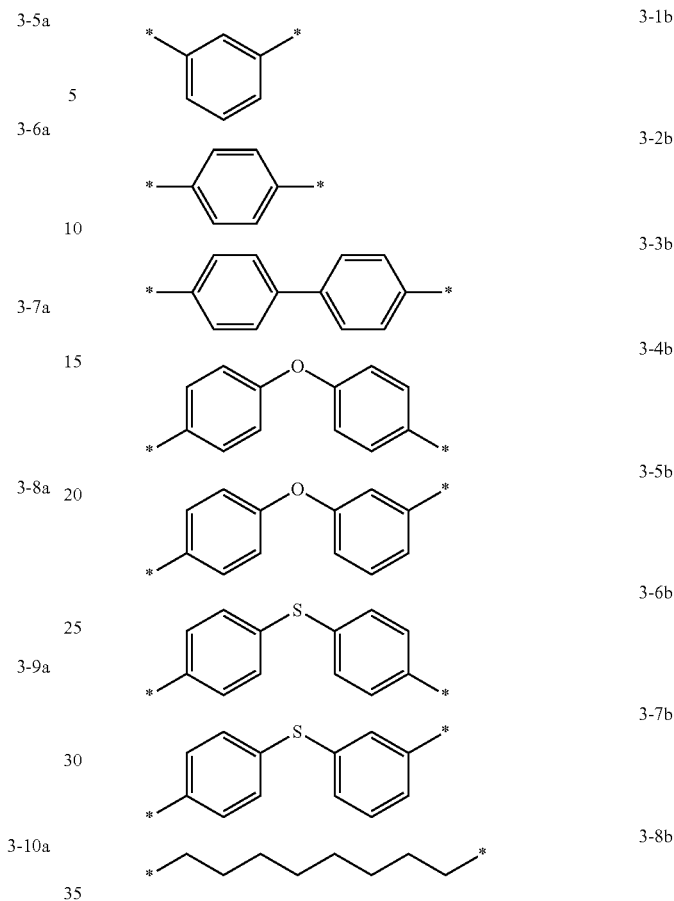

Specifically, $(J)_j$ in the above Formula 3 may be selected from the groups represented by the following Formulae 3-1b to 3-8b, but it is not limited thereto.

More specifically, $(J)_j$ in Formula 3 may be the group represented by the above Formula 3-1b, the group represented by the above Formula 3-2b, the group represented by the above Formula 3-3b, or the group represented by the above Formula 3-8b.

In an embodiment, a mixture of at least two kinds of dicarbonyl compounds different from each other may be used as the dicarbonyl compound. If two or more dicarbonyl compounds are used, at least two dicarbonyl compounds in which $(J)_j$ in the above Formula 2 is selected from the groups represented by the above Formulae 3-1b to 3-8b may be used as the dicarbonyl compound.

In another embodiment, the dicarbonyl compound may be an aromatic dicarbonyl compound that contains an aromatic structure.

The dicarbonyl compound may comprise terephthaloyl chloride (TPC), 1,1'-biphenyl-4,4'-dicarbonyl dichloride (BPDC), isophthaloyl chloride (IPC), as represented by the following formulae, or a combination thereof. But it is not limited thereto.

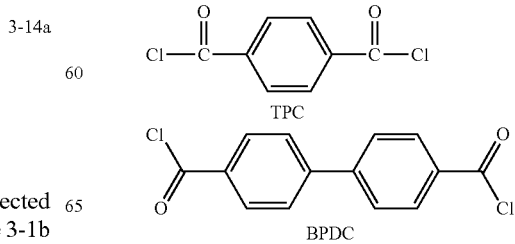

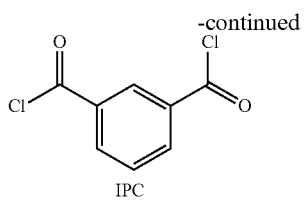

IPC

In an embodiment, the polyamide-based polymer may comprise two or more types of an amide-based repeat unit.

For example, the two or more types of an amide-based repeat unit may comprise a first amide-based repeat unit and a second amide-based repeat unit. The first amide-based repeat unit may be formed by reacting a first dicarbonyl compound with the diamine compound. The second amide-based repeat unit may be formed by reacting a second dicarbonyl compound with the diamine compound.

The first dicarbonyl compound and the second dicarbonyl compound may be compounds different from each other.

The first dicarbonyl compound and the second dicarbonyl compound may comprise two carbonyl groups, respectively. The angle between the two carbonyl groups contained in the first dicarbonyl compound may be greater than the angle between the two carbonyl groups contained in the second dicarbonyl compound.

In some examples, the first dicarbonyl compound and the second dicarbonyl compound may be structural isomers to each other. As two kinds of dicarbonyl compounds in a structural isomeric relationship are used, a polyamide-based polymer and film satisfying Equation 1 and/or Equation 2 and having the surface energy characteristics as described above can be formed. As a result, the optical properties, mechanical properties, and post-processing suitability of the polyamide-based polymer can be enhanced.

The first dicarbonyl compound and the second dicarbonyl compound may be an aromatic dicarbonyl compound, respectively. In some embodiments, the first dicarbonyl compound and the second dicarbonyl compound may each have one benzene ring (a phenyl group).

For example, the first dicarbonyl compound and the second dicarbonyl compound may be aromatic dicarbonyl compounds different from each other, but they are not limited thereto.

If the first dicarbonyl compound and the second dicarbonyl compound are an aromatic dicarbonyl compound, respectively, they comprise a benzene ring. Thus, they can contribute to improvements in the mechanical properties such as surface hardness and tensile strength of a film that comprises the polyamide-based polymer thus produced.

For example, the angle between the two carbonyl groups contained in the first dicarbonyl compound may be 160 to 180°, and the angle between the two carbonyl groups contained in the second dicarbonyl compound may be 80 to 140°.

For example, the dicarbonyl compound may comprise a first dicarbonyl compound and/or a second dicarbonyl compound.

For example, the first dicarbonyl compound may comprise TPC, and the second dicarbonyl compound may comprise IPC, but they are not limited thereto.

If TPC is used as the first dicarbonyl compound and IPC is used as the second dicarbonyl compound in a proper combination, a film that comprises the polyamide-based resin thus produced may have high oxidation resistance, productivity, light transmittance, transparency, and modulus, low haze, and excellent post-processing suitability.

The diamine compound and the dicarbonyl compound may be polymerized to form a repeat unit represented by the following Formula B.

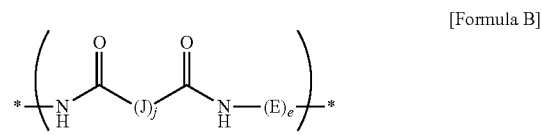

[Formula B]

In Formula B, E, J, e, and j are as described above.

For example, the diamine compound and the dicarbonyl compound may be polymerized to form amide repeat units represented by the following Formulae B-1 and B-2.

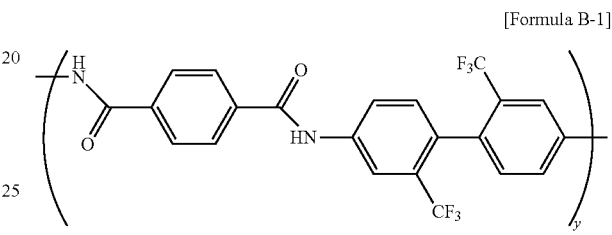

[Formula B-1]

In Formula B-1, y is an integer of 1 to 400.

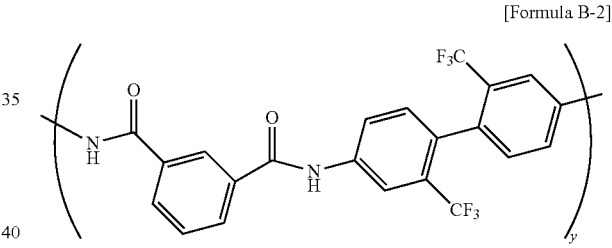

[Formula B-2]

In Formula B-2, y is an integer of 1 to 400.

In some embodiments, the molar ratio of the first amide-based repeat unit to the second amide-based repeat unit may be 10:90 to 79:21. As the molar ratio of the first and second amide-based repeat units is set to the above range, the dipolar solvent compatibility, dispersible solvent compatibility, and surface energy characteristics of the polyamide-based polymer may be adjusted to the above ranges. Accordingly, it is possible to improve the haze, light transmittance, yellow index, modulus, and post-processing suitability (or coating suitability) of the polyamide-based film. Preferably, the molar ratio of the first amide-based repeat unit to the second amide-based repeat unit may be 25:75 to 79:21, 25:75 to 75:25, 30:70 to 79:21, 30:70 to 75:25, or 40:60 to 75:25.

The dianhydride compound is not particularly limited, but it may comprise an aromatic dianhydride compound. For example, the dianhydride compound may reduce the birefringence characteristics of the polyamide-based resin and enhance such optical properties as transmittance of the polyamide-based film.

In an embodiment, the dianhydride compound may comprise a compound having a fluorine-containing substituent. In such an event, the fluorine-containing substituent may be a fluorinated hydrocarbon group. Specifically, it may comprise a perfluorinated alkyl group such as a trifluoromethyl group (—$C_nF_{4n-1}$, wherein n is a positive integer), but it is not limited thereto.

In some embodiments, the dianhydride compound may comprise two or more aromatic ring groups substituted with a dianhydride group. The aromatic ring groups may be connected to each other by a fluorine-containing substituent. The fluorine-containing substituent may comprise a hydrocarbon group substituted with a fluorinated alkyl group. For example, the fluorinated alkyl group may comprise a perfluorinated alkyl group such as a trifluoromethyl group (—$C_nF4_{n-1}$, wherein n is a positive integer). The hydrocarbon group may comprise a saturated hydrocarbon group, for example, an alkylene group such as a methylene group (—$CH_2$—).

For example, the aromatic dianhydride compound may comprise a compound represented by the following Formula 2.

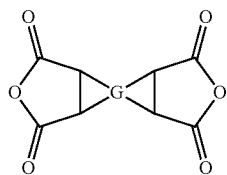

[Formula 2]

In Formula 2, G is a substituted or unsubstituted tetravalent $C_6$-$C_{30}$ aliphatic cyclic group, a substituted or unsubstituted tetravalent $C_4$-$C_{30}$ heteroaliphatic cyclic group, a substituted or unsubstituted tetravalent $C_6$-$C_{30}$ aromatic cyclic group, or a substituted or unsubstituted tetravalent $C_4$-$C_{30}$ heteroaromatic cyclic group, wherein the aliphatic cyclic group, the heteroaliphatic cyclic group, the aromatic cyclic group, or the heteroaromatic cyclic group may be present alone, fused to each other to form a condensed ring, or bonded by a bonding group selected from a substituted or unsubstituted $C_1$-$C_{30}$ alkylene group, a substituted or unsubstituted $C_2$-$C_{30}$ alkenylene group, a substituted or unsubstituted $C_2$-$C_{30}$ alkynylene group, —O—, —S—, —C(=O)—, —CH(OH)—, —S(=O)$_2$—, —Si(CH$_3$)$_2$—, —C(CH$_3$)$_2$—, and —C(CF$_3$)$_2$—.

G in the above Formula 2 may be selected from the groups represented by the following Formulae 2-1a to 2-9a, but it is not limited thereto.

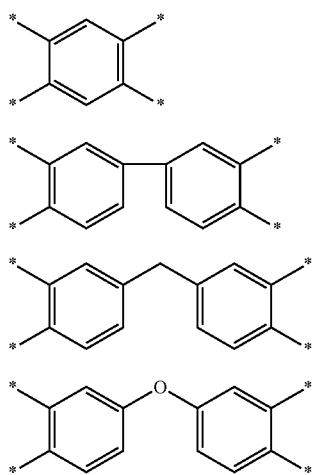

2-1a 2-2a 2-3a 2-4a

-continued

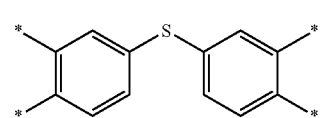

2-5a

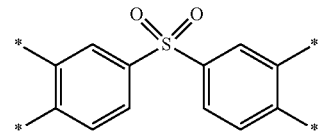

2-6a

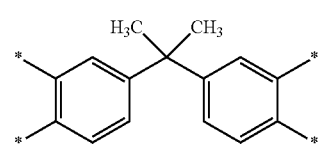

2-7a

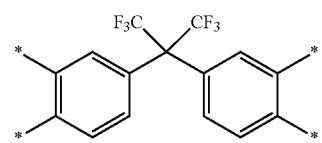

2-8a

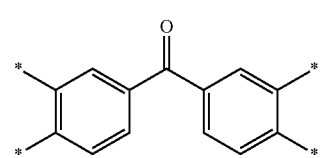

2-9a

For example, G in Formula 2 may be the group represented by the above Formula 2-2a, the group represented by the above Formula 2-8a, or the group represented by the above Formula 2-9a.

For example, the dianhydride compound may comprise 2,2'-bis-(3,4-dicarboxyphenyl)hexafluoropropane dianhydride (6-FDA) represented by the following formula, but it is not limited thereto.

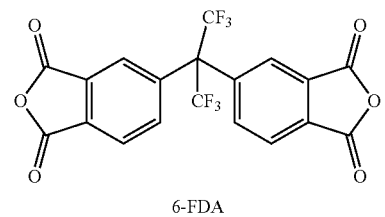 [SMILES: O=C1OC(=O)c2cc(C(c3ccc4c(c3)C(=O)OC4=O)(C(F)(F)F)C(F)(F)F)ccc21]

6-FDA

The diamine compound and the dianhydride compound may be polymerized to form an amic acid group.

Subsequently, the amic acid group may be converted to an imide group through a dehydration reaction. In such a case, a polyamide-imide-based polymer comprising a polyimide segment and a polyamide segment may be formed.

The polyimide segment may form a repeat unit represented by the following Formula A.

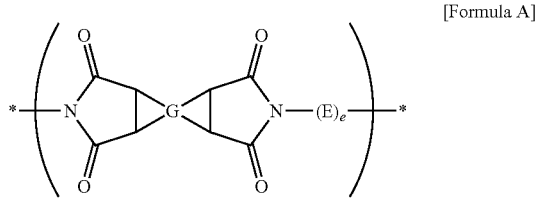

[Formula A]

In Formula A, E, G, and e are as described above.

For example, the polyimide segment may comprise a repeat unit represented by the following Formula A-1, but it is not limited thereto.

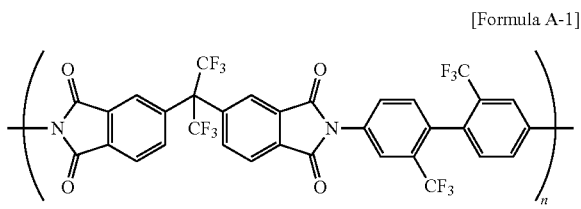

[Formula A-1]

In Formula A-1, n may be an integer of 1 to 400.

In some embodiments, the polyamide-based film has a thickness deviation of 4 μm or less based on a thickness of 50 μm. The thickness deviation may refer to a deviation between the maximum or minimum value with respect to the average of thicknesses measured at 10 random positions of the film. In such a case, as the polyamide-based film has a uniform thickness, its optical properties and mechanical properties at each point may be uniformly exhibited.

The polyamide-based film may have a haze of 1% or less. For example, the haze may be 0.5% or less or 0.4% or less, but it is not limited thereto.

The polyamide-based film may have a transmittance of 80% or more. For example, the transmittance may be 82% or more, 85% or more, 88% or more, 89% or more, 80% to 99%, 88% to 99%, or 89% to 99%, but it is not limited thereto.

The polyamide-based film may have a yellow index of 3.5 or less. For example, the yellow index may be 3 or less, 2.5 or less, or 2 or less, but it is not limited thereto.

The polyamide-based film may have a modulus of 4.5 GPa or more. Specifically, the modulus may be 5.0 GPa or more, 5.5 GPa or more, or 6.0 GPa or more, but it is not limited thereto.

The polyamide-based film may have a compressive strength of 0.4 kgf/μm or more. Specifically, the compressive strength may be 0.45 kgf/μm or more, or 0.46 kgf/μm or more, but it is not limited thereto.

When the polyamide-based film is perforated at a speed of 10 mm/min using a 2.5-mm spherical tip in a UTM compression mode, the maximum diameter (mm) of perforation including a crack is 60 mm or less. Specifically, the maximum diameter of perforation may be 5 to 60 mm, 10 to 60 mm, 15 to 60 mm, 20 to 60 mm, 25 to 60 mm, or 25 to 58 mm, but it is not limited thereto.

The polyamide-based film may have a surface hardness of HB or higher. Specifically, the surface hardness may be H or higher, or 2H or higher, but it is not limited thereto.

The polyamide-based film may have a tensile strength of 15 kgf/mm² or more. Specifically, the tensile strength may be 18 kgf/mm² or more, 20 kgf/mm² or more, 21 kgf/mm² or more, or 22 kgf/mm² or more, but it is not limited thereto.

The polyamide-based film may have an elongation of 15% or more. Specifically, the elongation may be 16% or more, 17% or more, or 17.5% or more, but it is not limited thereto.

The polyamide-based film according to an embodiment has excellent optical properties in terms of low haze, low yellow index, and high transmittance, as well as excellent mechanical properties such as modulus, whereby it can have a good affinity with a post-processing solution.

The physical properties of the polyamide-based film as described above are based on a thickness of 40 μm to 60 μm. For example, the physical properties of the polyamide-based film are based on a thickness of 50 μm.

The features on the components and properties of the polyamide-based film as described above may be combined with each other.

For example, the polyamide-based film comprises a polyamide-based polymer and may have a transmittance of 80% or more, a haze of 1% or less, and a yellow index of 3.5 or less.

In addition, the compatibility with the dipolar solvent and dispersible solvent and the surface energy characteristics of the polyamide-based film as described above may be the results materialized by combinations of the chemical and physical properties of the components, which constitute the polyamide-based film, along with the conditions in each step of the process for preparing the polyamide-based film as described below.

For example, the composition and contents of the components that constitute the polyamide-based film, the polymerization conditions and thermal treatment conditions in the film preparation process, and the like are all combined to achieve the desired level of solvent compatibility and surface energy characteristics.

Cover Window for a Display Device

The cover window for a display device according to an embodiment comprises a polyamide-based film and a functional layer.

The polyamide-based film comprises a polyamide-base polymer, wherein the dipolar solvent compatibility represented by the above Equation 1 is 18.5 to 24.

Details on the polyamide-based film are as described above.

The cover window for a display device can be advantageously applied to a display device.

As the polyamide-based film has a dipolar solvent compatibility within the above range, it may have excellent optical and mechanical properties.

Display Device

The display device according to an embodiment comprises a display unit; and a cover window disposed on the display unit, wherein the cover window comprises a polyamide-based film and a functional layer.

The polyamide-based film comprises a polyamide-based polymer, wherein the dipolar solvent compatibility represented by the above Equation 1 is 18.5 to 24.

Details on the polyamide-based film and the cover window are as described above.

FIG. 1 is a cross-sectional view of a display device according to an embodiment.

Specifically, FIG. 1 illustrates a display device, which comprises a display unit (400) and a cover window (300) disposed on the display unit (400), wherein the cover window comprises a polyamide-based film (100) having a first side (101) and a second side (102) and a functional layer (200), and an adhesive layer (500) is interposed between the display unit (400) and the cover window (300).

The display unit (400) is for displaying an image, and it may have flexible characteristics.

The display unit (400) may be a display panel for displaying an image. For example, it may be a liquid crystal display panel or an organic electroluminescent display panel. The organic electroluminescent display panel may comprise a front polarizing plate and an organic EL panel.

The front polarizing plate may be disposed on the front side of the organic EL panel. Specifically, the front polarizing plate may be attached to the side on which an image is displayed in the organic EL panel.

The organic EL panel may display an image by self-emission of a pixel unit. The organic EL panel may comprise an organic EL substrate and a driving substrate. The organic EL substrate may comprise a plurality of organic electroluminescent units, each of which corresponds to a pixel. Specifically, it may comprise a cathode, an electron transport layer, a light-emitting layer, a hole transport layer, and an anode. The driving substrate is operatively coupled to the organic EL substrate. That is, the driving substrate may be coupled to the organic EL substrate so as to apply a driving signal such as a driving current, so that the driving substrate can drive the organic EL substrate by applying a current to the respective organic electroluminescent units.

In addition, an adhesive layer (500) may be interposed between the display unit (400) and the cover window (300). The adhesive layer may be an optically transparent adhesive layer, but it is not particularly limited.

The cover window (300) may be disposed on the display unit (400). The cover window is located at the outermost position of the display device to thereby protect the display unit.

The cover window (300) may comprise a polyamide-based film and a functional layer. The functional layer may be at least one selected from the group consisting of a hard coating layer, a reflectance reducing layer, an antifouling layer, and an antiglare layer. The functional layer may be coated on at least one side of the polyamide-based film.

The polyamide-based film according to an embodiment can be applied in the form of a film to the outside of a display device without changing the display driving method, the color filter inside the panel, or the laminated structure, thereby providing a display device having a uniform thickness, low haze, high transmittance, and high transparency. Since neither significant process changes nor cost increases are needed, it is advantageous in that the production costs can be reduced.

The polyamide-based film according to an embodiment may be excellent in optical properties in terms of high transmittance, low haze, and low yellow index, as well as may have high modulus and excellent post-processing suitability.

In addition, the polyamide-based film according to an embodiment can minimize the optical distortion since it has at most a certain level of in-plane retardation and a thickness direction retardation and can also reduce the light leakage from a lateral side.

In the polyamide-based film having a dipolar solvent compatibility and/or a dispersible solvent compatibility within the above ranges, it may be post-treated or coated uniformly over a larger area of the film, and the closeness and adhesion of the post-treatment and coating can be enhanced. Accordingly, the polyamide-based film according to an embodiment may have substantially uniform optical properties and mechanical properties over the entire area even when applied to a large-scale display device. When it is applied to a foldable/rollable/flexible display device and bent repeatedly, the post-processing (coating) may not be easily delaminated from the polyamide-based film.

Process for Preparing a Polyamide-Based Film

An embodiment provides a process for preparing a polyamide-based film.

The process for preparing a polyamide-based film according to an embodiment comprises polymerizing a diamine compound and a dicarbonyl compound to prepare a solution comprising a polyamide-based polymer in an organic solvent; casting the polymer solution and then drying it to prepare a gel sheet; and thermally treating the gel sheet.

Referring to FIG. 2, the process for preparing a polyamide-based film according to an embodiment comprises polymerizing a diamine compound and a dicarbonyl compound in an organic solvent to prepare a solution comprising a polyamide-based polymer (S100); casting the polymer solution to prepare a gel sheet (S200); and thermally treating the gel sheet (S300).

The process for preparing a polyamide-based film according to some embodiments may further comprise adjusting the viscosity of the polyamide-based polymer solution (S110), aging the polyamide-based polymer solution (S120), and/or degassing the polyamide-based polymer solution (S130).

The polyamide-based film is a film in which a polyamide-based polymer is a main component. The polyamide-based polymer is a resin that comprises an amide repeat unit as a structural unit. Optionally, the polyamide-based polymer may comprise an imide repeat unit.

In the process for preparing a polyamide-based film, the polymer solution for preparing a polyamide-based polymer may be prepared by simultaneously or sequentially mixing a diamine compound and a dicarbonyl compound in an organic solvent in a reactor, and reacting the mixture (S100).

In an embodiment, the polymer solution may be prepared by simultaneously mixing and reacting a diamine compound and a dicarbonyl compound in an organic solvent.

In another embodiment, the step of preparing the polymer solution may comprise mixing and reacting the diamine compound and the dicarbonyl compound in a solvent to produce a polyamide (PA) solution. The polyamide solution is a solution that comprises a polymer having an amide repeat unit.

In an embodiment, the step of preparing the polymer solution may be carried out by using two kinds of dicarbonyl compounds different from each other as the dicarbonyl compound. In such a case, the two kinds of dicarbonyl compounds may be mixed and reacted simultaneously or sequentially. Preferably, the first dicarbonyl compound and the diamine compound may react to form a prepolymer, and the prepolymer and the second dicarbonyl compound may react to form the polyamide-based polymer. In such a case, the dipolar solvent compatibility, dispersible solvent compatibility, and surface energy characteristics of the polyamide-based polymer may be readily adjusted.

The polymer contained in the polymer solution comprises an amide repeat unit derived from the polymerization of the diamine compound and the dicarbonyl compound.

Alternatively, the polymer contained in the polymer solution may comprise an imide repeat unit derived from the polymerization of the diamine compound and the dianhydride compound and an amide repeat unit derived from the polymerization of the diamine compound and the dicarbonyl compound.

In an embodiment, the step of preparing the solution comprising a polyamide-based polymer may be carried out at a temperature of −20 to 25° C. For example, the mixing and reaction of the solvent, the diamine compound, and the dicarbonyl compound may be carried out at a temperature of −20 to 25° C. If the temperature is outside the above temperature range, excessively few or many polymerization nuclei are formed, thereby making it difficult to form a polyamide-based polymer having desired properties. As a result, a solvent compatibility and surface energy characteristics in the above ranges may not be achieved. Thus, such properties as modulus and yellow index of the polyamide-based film may be deteriorated. In addition, the viscosity of the polymer solution may be less than a predetermined range, thereby increasing the thickness deviation of a film formed therefrom. Preferably, the step of preparing the solution comprising a polyamide-based polymer may be carried out at a temperature of −20 to 20° C., −20 to 15° C., −20 to 10° C., −15 to 20° C., −15 to 15° C., −15 to 10° C., −10 to 20° C., −10 to 15° C., −10 to 10° C., −8 to 20° C., −8 to 15° C., −8 to 10° C., −5 to 20° C., −5 to 15° C., or −5 to 10° C.

The content of solids contained in the polymer solution may be 10% by weight to 30% by weight, but it is not limited thereto.

If the content of solids contained in the polymer solution is within the above range, a polyamide-based film can be effectively produced in the casting step. In addition, the polyamide-based film thus produced may have mechanical properties in terms of an improved modulus and the like and optical properties in terms of a low yellow index and the like.

In still another embodiment, the step of preparing the polymer solution may further comprise adjusting the pH of the polymer solution. In this step, the pH of the polymer solution may be adjusted to 4 to 7, for example, 4.5 to 7.

The pH of the polymer solution may be adjusted by adding a pH adjusting agent. The pH adjusting agent is not particularly limited and may include, for example, amine-based compounds such as alkoxyamine, alkylamine, and alkanolamine.

As the pH of the polymer solution is adjusted to the above range, it is possible to prevent the occurrence of defects in the film produced from the polymer solution and to achieve the desired optical properties and mechanical properties in terms of yellow index and modulus.

The pH adjusting agent may be employed in an amount of 0.1% by mole to 10% by mole based on the total number of moles of monomers in the polymer solution.

The molar ratio of the first dicarbonyl compound to the second dicarbonyl compound for the preparation of the polymer solution may be 10:90 to 79:21, preferably, 25:75 to 79:21, 25:75 to 75:25, 30:70 to 79:21, 30:70 to 75:25, or 40:60 to 75:25.

As the first dicarbonyl compound and the second dicarbonyl compound are used at such a ratio, it is possible to prepare a polyamide-based polymer having a solvent compatibility and surface energy characteristics within the above ranges and to improve the modulus, haze, light transmittance, yellow index, and the like of the polyamide-based film.

Details on the diamine compound and the dicarbonyl compound are as described above.

In an embodiment, the organic solvent may be at least one selected from the group consisting of dimethylformamide (DMF), dimethylacetamide (DMAc), N-methyl-2-pyrrolidone (NMP), m-cresol, tetrahydrofuran (THF), and chloroform. The organic solvent employed in the polymer solution may be dimethylacetamide (DMAc), but it is not limited thereto.

The polymer solution may be stored at −20° C. to 20° C., −20° C. to 10° C., −20° C. to 5° C., −20° C. to 0° C., or 0° C. to 10° C.

If it is stored at the above temperature, it is possible to prevent degradation of the polymer solution and to lower the moisture content to thereby prevent defects of a film produced therefrom.

In an embodiment, the process may further comprise adjusting the viscosity of the polymer solution (S110) after the step of preparing the polymer solution. The viscosity of the polymer solution may be 200,000 cps to 350,000 cps at room temperature. In such an event, the film-forming capability of a polyamide-type film can be enhanced, thereby enhancing the thickness uniformity.

Specifically, the step of preparing the polymer solution may comprise simultaneously or sequentially mixing and reacting a diamine compound and a dicarbonyl compound in an organic solvent to prepare a first polymer solution; and further adding the dicarbonyl compound to prepare a second polymer solution having the target viscosity.

In the steps of preparing the first polymer solution and the second polymer solution, the polymer solutions may have viscosities different from each other. For example, the second polymer solution may have a viscosity higher than that of the first polymer solution.

In the steps of preparing the first polymer solution and the second polymer solution, the stirring speeds may be different from each other. For example, the stirring speed when the first polymer solution is prepared may be faster than the stirring speed when the second polymer solution is prepared.

In some embodiments, the polymer solution or the polymer solution whose viscosity has been adjusted may be aged (S120).

The aging may be carried out by leaving the polymer solution at a temperature of −10 to 10° C. for 24 hours or longer. In such an event, the polyamide-based polymer or unreacted materials contained in the polymer solution, for example, may complete the reaction or achieve a chemical equilibrium, whereby the polymer solution may be homogenized. The mechanical properties, optical properties, and surface energy characteristics of a polyamide-based film formed therefrom may be substantially uniform over the entire area of the film. Preferably, the aging may be carried out at a temperature of −5 to 10° C., −5 to 5° C., or −3 to 5° C.

In an embodiment, the process may further comprise degassing the polyamide-based polymer solution (S130). The step of degassing may remove moisture in the polymer solution and reduce impurities, thereby increasing the reaction yield and imparting excellent surface appearance and mechanical properties to the film finally produced.

The degassing may comprise vacuum degassing or purging with an inert gas.

The vacuum degassing may be carried out for 30 minutes to 3 hours after depressurizing the internal pressure of the tank in which the polymer solution is contained to 0.1 bar to 0.7 bar. The vacuum degassing under these conditions may reduce bubbles in the polymer solution. As a result, it is possible to prevent surface defects of the film produced therefrom and to achieve excellent optical properties such as haze.

Specifically, the purging may be carried out by purging the tank with an inert gas at an internal pressure of 1 atm to 2 atm. The purging under these conditions may remove moisture in the polymer solution, reduce impurities to thereby increase the reaction yield, and achieve excellent optical properties such as haze and mechanical properties.

The inert gas may be at least one selected from the group consisting of nitrogen, helium (He), neon (Ne), argon (Ar), krypton (Kr), xenon (Xe), and radon (Rn), but it is not limited thereto. Specifically, the inert gas may be nitrogen.

The vacuum degassing and the purging with an inert gas may be carried out in separate steps.

For example, the step of vacuum degassing may be carried out, followed by the step of purging with an inert gas, but it is not limited thereto.

The vacuum degassing and/or the purging with an inert gas may improve the physical properties of the surface of a polyamide-based film thus produced.

Once the solution comprising a polyamide-based polymer in an organic solvent has been prepared as described above, a filler may be added to the solution.

The filler has an average particle diameter of 60 nm to 180 nm and a refractive index of 1.55 to 1.75. The content thereof is 100 ppm to 3,000 ppm based on the total weight of the solids content of the polyamide-based polymer. In addition, the filler may be silica or barium sulfate.

Details on the filler are as described above.

The polymer solution may be cast to prepare a gel sheet (S200).

For example, the polymer solution may be extruded, coated, and/or dried on a support to form a gel sheet.

In addition, the casting thickness of the polymer solution may be 200 μm to 700 μm. As the polymer solution is cast to a thickness within the above range, the final film produced after the drying and thermal treatment may have an appropriate and uniform thickness.

The polymer solution may have a viscosity of 200,000 cps to 350,000 cps at room temperature as described above. As the viscosity satisfies the above range, the polymer solution can be cast to a uniform thickness without defects, and a polyamide-based film having a substantially uniform thickness can be formed without local/partial thickness variations during drying.

The polymer solution is cast and then dried at a temperature of 60° C. to 150° C. for 5 minutes to 60 minutes to prepare a gel sheet. Specifically, the polymer solution is dried at a temperature of 70° C. to 90° C. for 15 minutes to 40 minutes to prepare a gel sheet.

The solvent of the polymer solution may be partially or totally volatilized during the drying to prepare the gel sheet.

The dried gel sheet may be thermally treated to form a polyamide-based film (S300).

The thermal treatment of the gel sheet may be carried out, for example, through a thermosetting device.

The thermosetting device may thermally treat the gel sheet through hot air.

If the thermal treatment is carried out with hot air, the heat may be uniformly supplied. If the heat is not uniformly supplied, a satisfactory surface roughness cannot be achieved, which may raise or lower the surface energy too much.

The thermal treatment of the gel sheet may be carried out in a temperature range of 60° C. to 500° C. for 5 minutes to 200 minutes. Specifically, the thermal treatment of the gel sheet may be carried out in a temperature range of 80° C. to 300° C. at a temperature elevation rate of 1.5° C./min to 20° C./min for 10 minutes to 150 minutes.

In such event, the initial temperature of the thermal treatment of the gel sheet may be 60° C. or higher. Specifically, the initial temperature of the thermal treatment of the gel sheet may be 80° C. to 180° C.

In addition, the maximum temperature in the thermal treatment may be 300 to 500° C. For example, the maximum temperature in the thermal treatment may be 350° C. to 500° C., 380° C. to 500° C., 400° C. to 500° C., 410° C. to 480° C., 410° C. to 470° C., or 410° C. to 450° C.

According to an embodiment, the thermal treatment of the gel sheet may be carried out in two or more steps.

Specifically, the thermal treatment may comprise a first hot air treatment step carried out for 5 minutes to 30 minutes in a range of 60° C. to 120° C.; and a second hot air treatment step carried out for 10 minutes to 120 minutes in a range of 120° C. to 350° C.

The thermal treatment under these conditions may cure the gel sheet to have appropriate surface hardness, modulus, and surface energy and may secure high light transmittance, low haze, and an appropriate level of glossiness of the cured film at the same time.

According to an embodiment, the thermal treatment may comprise passing it through an IR heater. The thermal treatment by an IR heater may be carried out for 1 minute to 30 minutes in a temperature range of 300° C. or higher. Specifically, the thermal treatment by an IR heater may be carried out for 1 minute to 20 minutes in a temperature range of 300° C. to 500° C.

The polyamide-based film is prepared by the preparation process as described above such that it may have surface energy characteristics and/or solvent compatibility as described above and may be excellent in optical properties and mechanical properties. In addition, as the polyamide-based film has a predetermined range of wettability and compatibility with methyl isobutyl ketone, ethanol, and the like used as a solvent for the post-processing solution, the post-processing solution may be evenly spread on the surface of the polyamide-based film, and the closeness and adhesion between the post-processed body (or coating layer) and the polyamide-based film may be enhanced. Accordingly, a post-processed body (or coating layer) having a uniform thickness can be formed, and the post-processed body (or coating layer) and the polyamide-based film may not be delaminated from each other even when deformation takes place repeatedly.

The polyamide-based film may be applicable to various uses that require flexibility, transparency, and a certain level of luminance. For example, the polyamide-based film may be applied to solar cells, displays, semiconductor devices, sensors, and the like.

In particular, since the polyamide-based film has excellent thickness uniformity and optical properties, it can be advantageously applied to a cover window for a display device and to a display device. Since it has excellent folding characteristics, it can be advantageously applied to a foldable display device or a flexible display device.

Details on the polyamide-based film prepared by the process for preparing a polyamide-based film are as described above.

MODE FOR THE INVENTION

Hereinafter, the present invention will be described in more detail with reference to the following examples. However, these examples are set forth to illustrate the present invention, and the scope of the present invention is not limited thereto.

EXAMPLE

Example 1

A 1-liter glass reactor equipped with a temperature-controllable double jacket was charged with 567 g of dimethylacetamide (DMAc) as an organic solvent at 10° C. under a nitrogen atmosphere. Then, 64.0 g (0.200 mole) of 2,2'-bis(trifluoromethyl)-4,4'-diaminobiphenyl (TFMB) as an aromatic diamine was slowly added thereto and dissolved.

Subsequently, terephthaloyl chloride (TPC) as a first dicarbonyl compound was slowly added, followed by stirring the mixture for 1 hour. Then, isophthaloyl chloride (IPC) as a second dicarbonyl compound was added in an amount of 94% based on the total introduced amount, followed by stirring the mixture for 1 hour, thereby preparing a first polymer solution.

And an IPC solution at 10% by weight in a DMAc organic solvent was prepared.

1 ml of the IPC solution was added to the first polymer solution, followed by stirring the mixture for 30 minutes, which procedure was repeated. About 6% of IPC based on the total introduced amount was reacted through this to prepare a second polymer solution having a viscosity of about 230,000 cps. Here, the reaction temperature was adjusted to about 10° C.

The second polymer solution was left at about 0° C. for about one day, and it was then coated onto a glass plate and dried. The dried polyamide polymer was peeled off from the glass plate and thermally treated, whereby a polyamide-based film having a thickness of 50 μm was obtained.

As to the contents of the diamine compound (TFMB) and the dicarbonyl compounds (IPC and TPC), the number of moles of the dicarbonyl compounds based on 100 moles of the diamine compound is shown in Table 1.

Examples 2 to 5 and Comparative Examples 1 to 3

Films were prepared in the same manner as in Example 1, except that the contents of the respective reactants, the polymerization temperature, and the drying temperature were changed as shown in Table 1 below. In Example 3, 2,2'-bis(3,4-dicarboxyphenyl)hexafluoropropane dianhydride (6-FDA) was further employed when the polyamide-based polymer was polymerized.

Evaluation Example

The films prepared in the Examples and Comparative Examples were each measured and evaluated for the following properties. The results are shown in Tables 1 and 2 below.

Evaluation Example 1: Analysis of Surface Energy

The surface of the polyamide-based film of the Examples and Comparative Examples was cleaned. Then, an MSA (mobile surface analyzer) of KRUSS was placed on the surface, and the surface free energy, non-polarity (disperse part), and polarity (polar part) calculated by the OWRK method were measured. In the measurement, water was selected as a polar solvent, and diiodomethane was used as a non-polar solvent. The same measurement was repeated 5 times, and the average of three measurements excluding the upper and lower limits was calculated and shown in Table 1 below.

Evaluation Example 2: Evaluation of Solvent Compatibility

The dipole solvent compatibility and dispersible solvent compatibility according to Equations 1 and 2 for the polyamide-based film with methyl isobutyl ketone ($\delta 1_t=17$, $\delta 1_d=15$, $\delta 1_p=6.1$) as a dipolar solvent and toluene ($\delta 2_t=8.88$, $\delta 2_d=8.8$, $\delta 2_p=0.68$) and chloroform ($\delta 2_t=9.29$, $\delta 2_d=8.7$, $\delta 2_p=1.52$) as a dispersible solvent were calculated and shown in Table 1 below.

TABLE 1

| | | Ex. 1 | Ex. 2 | Ex. 3 | Ex. 4 | Ex. 5 | C. Ex. 1 | C. Ex. 2 | C. Ex. 3 |
|---|---|---|---|---|---|---|---|---|---|
| Polymerization ratio of the polyamide-based film | Diamine compound | TFMB 100 | TFMB 100 | TFMB 100 | TFMB 100 | TFMB 100 | TFMB 100 | TFMB 100 | TFMB 100 |
| | Dicarbonyl compound | TPC 75 IPC 25 | TPC 70 IPC 30 | TPC 50 IPC 10 | TPC 60 IPC 40 | TPC 40 IPC 60 | TPC 95 IPC 5 | TPC 80 IPC 20 | TPC 5 IPC 95 |
| | Dianhydride | — | — | 6-FDA 40 | — | — | — | — | — |
| Polymerization temp. (° C.) | | 10 | 10 | 10 | 10 | 10 | 10 | 10 | 30 |
| First drying temp. (° C.) | | 120 | 130 | 120 | 120 | 120 | 120 | 120 | 130 |
| Second drying temp. (° C.) | | 250 | 250 | 250 | 250 | 250 | 250 | 250 | 250 |
| Surface energy (mN/m) | Total | 38.32 | 39.48 | 41.03 | 39.4 | 36.85 | 43.52 | 43.84 | 34.72 |
| | Dispersible comp. | 34.63 | 35.93 | 36 | 35.79 | 34.04 | 39.29 | 39.52 | 32.9 |
| | Polar comp. | 3.69 | 3.55 | 5.13 | 3.61 | 2.81 | 4.23 | 4.32 | 1.82 |
| Solvent compatibility | Methyl isobutyl ketone | 19.8 | 21.1 | 23.5 | 20.9 | 19.3 | 24.4 | 24.6 | 18.4 |
| | Toluene | 26.0 | 27.3 | 28.3 | 27.1 | 25.3 | 30.7 | 30.9 | 24.1 |
| | Chloroform | 26.0 | 27.3 | 27.5 | 27.2 | 25.4 | 30.7 | 30.9 | 24.2 |

Evaluation Example 3: Measurement of Film Thickness

The thickness was measured at 10 random points in the transverse direction of the film using a digital micrometer 547-401 manufactured by Mitutoyo Corporation. Their average value was adopted as the thickness.

Evaluation Example 4: Measurement of Modulus

A sample was cut out by at least 10 cm in the direction perpendicular to the main shrinkage direction of the film and by 10 cm in the main shrinkage direction. It was fixed by the clips disposed at an interval of 10 cm in a universal testing machine UTM 5566A of Instron. A stress-strain curve was obtained until the sample was fractured while it was stretched at a rate of 12.5 mm/min at room temperature. The slope of the load with respect to the initial strain on the stress-strain curve was taken as the modulus (GPa).

Evaluation Example 5: Measurement of Transmittance and Haze

The light transmittance and haze were measured using a haze meter NDH-5000W manufactured by Nippon Denshoku Kogyo in accordance with the JIS K 7136 standard.

Evaluation Example 6: Measurement of Yellow Index

The yellow index (YI) was measured with a spectrophotometer (UltraScan PRO, Hunter Associates Laboratory) under the conditions of d65 and 100 in accordance with the ASTM-E313 standard.

Evaluation Example 7: Evaluation of Solvent Affinity

The polyamide-based film was cut to an A4 size to prepare a specimen. Methyl isobutyl ketone (MIBK) was evenly applied on the surface of the specimen using Mayer bar #3. After 5 seconds, an optical image of the surface of the specimen was obtained, and the ratio of the area coated with methyl isobutyl ketone to the total area of the specimen was calculated from the image.

When the area coated with methyl isobutyl ketone was 90% or more, it was evaluated as good. When it was less than 90%, it was evaluated as poor. They are shown in Table 2 below.

TABLE 2

|  | Ex. 1 | Ex. 2 | Ex. 3 | Ex. 4 | Ex. 5 | C. Ex. 1 | C. Ex. 2 | C. Ex. 3 |
| --- | --- | --- | --- | --- | --- | --- | --- | --- |
| Thickness (μm) | 50 | 50 | 50 | 50 | 50 | 50 | 50 | 50 |
| Modulus (GPa) | 6.8 | 6.94 | 6.29 | 6.29 | 4.95 | 5.67 | 6.76 | 3.87 |
| Transmittance (%) | 88.9 | 89.0 | 89.0 | 89.0 | 89.3 | 76.9 | 85.4 | 89.3 |
| Haze (%) | 0.4 | 0.4 | 0.3 | 0.3 | 0.3 | 68.74 | 344 | 0.28 |
| Yellow index | 2.72 | 3.14 | 2.42 | 2.42 | 2.5 | 29.14 | 21.99 | 3.81 |
| Solvent affinity | Good | Good | Good | Good | Good | Poor | Poor | Poor |

Referring to Tables 1 and 2, the polyamide-based films of the Examples having a compatibility with the dipolar solvent of 18.5 to 24 were excellent in modulus, transmittance, haze, yellow index, and solvent affinity.

In contrast, in the polyamide-based films of Comparative Examples 1 and 2 having a compatibility with the dipolar solvent of more than 24, the surface of the polyamide-based film was partially dissolved and damaged when the solvent affinity was evaluated, and the area coated with the solvent was less than 90%.

In addition, in the polyamide-based film of Comparative Example 3 having a compatibility with the dipolar solvent of less than 18.5, the wettability to methyl isobutyl ketone used as a coating solvent was insufficient, so that methyl isobutyl ketone partially aggregated on the surface of the film.

Accordingly, the polyamide-based films of the Examples having a dipolar solvent compatibility and/or a dispersible solvent compatibility within the above ranges were excellent in coating suitability for a functional layer such as a reflectance reducing layer, an antifouling layer, and an antiglare layer, so that it can be applied as a cover window having excellent mechanical and optical properties.

The invention claimed is:

1. A polyamide-based film, which comprises a polyamide-based polymer, wherein a dipolar solvent compatibility represented by the following Equation 1 is 19.5 to 23.5:

$$\text{Dipolar solvent compatibility} = \sqrt{(\sigma_d - \delta 1_d)^2 + (\sigma_p - \delta 1_p)^2} \quad \text{[Equation 1]}$$

in Equation 1, $\sigma_d$ is a value of a dispersible component in surface energy of the polyamide-based film, $\sigma_p$ is a value of a polar component in surface energy of the polyamide-based film, $\delta 1_d$ is a value of a dispersible component in Hansen solubility parameter of the dipolar solvent, which ranges from 13 to 17, and $\delta 1_p$ is a value of a dipolar component in Hansen solubility parameter of the dipolar solvent, which ranges from 5 to 13.

2. The polyamide-based film of claim 1, wherein $\delta 1_d$ in Equation 1 is 14 to 15.8.

3. The polyamide-based film of claim 1, wherein $\delta 1_p$ in Equation 1 is 6 to 10.

4. A polyamide-based film, which comprises a polyamide-based polymer, wherein a dispersible solvent compatibility represented by the following Equation 2 is 25.5 to 30:

$$\text{Dispersible solvent compatibility} = \sqrt{(\sigma_d - \delta 2_d)^2 + (\sigma_p - \delta 2_p)^2} \quad \text{[Equation 2]}$$

in Equation 2, $\sigma_d$ is a value of a dispersible component in surface energy of the polyamide-based film, $\sigma_p$ is a value of a polar component in surface energy of the polyamide-based film, $\delta 2_d$ is a value of a dispersible component in Hansen solubility parameter of the dispersible solvent, which ranges from 7 to 10, and $\delta 2_p$ is a value of a dipolar component in Hansen solubility parameter of the dispersible solvent, which ranges from 0.1 to 15.2.

5. The polyamide-based film of claim 4, wherein $\delta 2_p$ in Equation 2 is 0.1 to 4.

6. The polyamide-based film of claim 4, wherein $\delta 2_d$ in Equation 2 is 7.5 to 9.6.

7. The polyamide-based film of claim 1, wherein the polyamide-based polymer comprises two or more types of an amide-based repeat unit.

8. The polyamide-based film of claim 7, wherein the two or more types of an amide-based repeat unit comprise a first amide-based repeat unit derived from a first dicarbonyl compound and a second amide-based repeat unit derived from a second dicarbonyl compound, and an angle between two carbonyl groups contained in the first dicarbonyl compound is greater than an angle between two carbonyl groups contained in the second dicarbonyl compound.

9. The polyamide-based film of claim 1, wherein the polyamide-based polymer comprises an amide-based repeat unit and an imide-based repeat unit at a molar ratio of 51:49 to 100:0.

10. The polyamide-based film of claim 1, which, based on a thickness of the film of 50 μm, has a modulus of 4.5 GPa or more, a transmittance of 80% or more, a haze of 1% or less, and a yellow index of 3.5 or less.

11. A cover window for a display device, which comprises a polyamide-based film and a functional layer, wherein a dipolar solvent compatibility of the polyamide-based film represented by the following Equation 1 is 19.5 to 23.5:

$$\text{Dipolar solvent compatibility} = \sqrt{(\sigma_d - \delta 1_d)^2 + (\sigma_p - \delta 1_p)^2} \quad \text{[Equation 1]}$$

in Equation 1, $\sigma_d$ is a value of a dispersible component in surface energy of the polyamide-based film, $\sigma_p$ is a value of a polar component in surface energy of the polyamide-based film, $\delta 1_d$ is a value of a dispersible component in Hansen solubility parameter of the dipolar solvent, which ranges from 13 to 17, and $\delta 1_p$ is a value of a dipolar component in Hansen solubility parameter of the dipolar solvent, which ranges from 5 to 13.

12. A display device, which comprises a display unit; and the cover window according to claim 11 disposed on the display unit.

13. The polyamide-based film of claim 4, wherein the polyamide-based polymer comprises two or more types of an amide-based repeat unit.

14. The polyamide-based film of claim 13, wherein the two or more types of an amide-based repeat unit comprise a first amide-based repeat unit derived from a first dicarbonyl compound and a second amide-based repeat unit derived from a second dicarbonyl compound, and an angle between two carbonyl groups contained in the first dicarbonyl compound is greater than an angle between two carbonyl groups contained in the second dicarbonyl compound.

15. The polyamide-based film of claim 4, wherein the polyamide-based polymer comprises an amide-based repeat unit and an imide-based repeat unit at a molar ratio of 51:49 to 100:0.

16. The polyamide-based film of claim 4, which, based on a thickness of the film of 50 μm, has a modulus of 4.5 GPa or more, a transmittance of 80% or more, a haze of 1% or less, and a yellow index of 3.5 or less.

* * * * *